(12) United States Patent
Joseph

(10) Patent No.: US 9,521,921 B2
(45) Date of Patent: Dec. 20, 2016

(54) INTEGRATED HYBRID WATER AND BEVERAGE DISPENSER AND BREWING CUPS FOR USE THEREWITH

(71) Applicant: Steven W. Joseph, Portland, OR (US)

(72) Inventor: Steven W. Joseph, Portland, OR (US)

(*) Notice: Subject to any disclaimer, the term of this patent is extended or adjusted under 35 U.S.C. 154(b) by 360 days.

(21) Appl. No.: 14/292,889

(22) Filed: May 31, 2014

(65) Prior Publication Data

US 2015/0344285 A1 Dec. 3, 2015

(51) Int. Cl.
  *A47J 31/00* (2006.01)
  *A47J 31/36* (2006.01)
  *A47J 31/06* (2006.01)
  *B65D 85/804* (2006.01)

(52) U.S. Cl.
  CPC ........... *A47J 31/369* (2013.01); *A47J 31/0668* (2013.01); *A47J 31/368* (2013.01); *A47J 31/3676* (2013.01); *A47J 31/3685* (2013.01); *B65D 85/8043* (2013.01)

(58) Field of Classification Search
  CPC .. A47J 31/3685; A47J 31/368; A47J 31/3676; A47J 31/3638; A47J 31/3633
  USPC .............................. 99/295, 289 R, 284, 290
  See application file for complete search history.

(56) References Cited

U.S. PATENT DOCUMENTS

| | | | | |
|---|---|---|---|---|
| 5,816,135 A | * | 10/1998 | Ferri | A47J 31/06 222/146.2 |
| 7,650,830 B1 | * | 1/2010 | Lessis | A47J 31/605 222/145.5 |
| 7,997,187 B2 | * | 8/2011 | Garman | A47J 31/0573 99/304 |
| 2012/0231126 A1 | * | 9/2012 | Lo Faro | A47J 31/407 426/115 |
| 2013/0129871 A1 | * | 5/2013 | Ye | A47J 31/3623 426/115 |
| 2013/0220140 A1 | * | 8/2013 | Huillet | A47J 31/3623 99/295 |
| 2014/0123859 A1 | * | 5/2014 | Verbeek | B65D 85/8043 99/295 |
| 2015/0004288 A1 | * | 1/2015 | McHale | A47J 31/407 426/231 |

* cited by examiner

*Primary Examiner* — Reginald L Alexander
(74) *Attorney, Agent, or Firm* — James M. Smedley LLC; James Michael Smedley, Esq.

(57) ABSTRACT

The present invention relates to the field of beverage dispensers. Specifically, embodiments of the present invention provide an apparatus capable of dispensing water and other beverages through single serving or similar brewing containers. Preferred embodiments of the present invention are configured to be integrated within, on, upon an existing sink or water basin and operate in conjunction with an existing pressurized water source, such as municipal water source, well water source or other residential or commercial pressurized water system.

13 Claims, 12 Drawing Sheets

US 9,521,921 B2

1

INTEGRATED HYBRID WATER AND BEVERAGE DISPENSER AND BREWING CUPS FOR USE THEREWITH

FIELD OF THE INVENTION

The present invention relates to the field of beverage dispensers. Specifically, embodiments of the present invention provide an apparatus capable of dispensing water and other beverages through single serving or similar brewing containers. Preferred embodiments of the present invention are configured to be integrated within, on, upon an existing sink or water basin and operate in conjunction with an existing pressurized water source, such as municipal water source, well water source or other residential or commercial pressurized water system.

BACKGROUND

Counter mounted instant hot water dispensers are well known and widely used in the market today. These counter mount hot water dispensers are capable of providing a convenient means of dispensing near boiling hot water on demand. One benefit of these types of dispensers is that they can be used for production of beverages through use of beverage mediums, such as tea bags, beverage powders (e.g., hot chocolate powders), and instant coffee mixes. However, the beverage medium is generally placed in a beverage receptacle, such as a cup, mug or thermos, each being disassociated with the hot water dispenser. The mixing of the beverage occurs through an immersion process by using the dispensed hot liquid (e.g., water) with the beverage medium in the beverage receptacle.

Single serving and other format beverage dispensers (e.g., single serving coffee brewers, coffee machines, hot chocolate machines) are available on the market today but do not provide the same function of a basin mount instant hot water dispenser in that these beverage dispensers require water to be provided to the system in between each operation of after a limited number of operations in certain cases where the beverage dispenser is provided with a reservoir (e.g., water tank, spring water bottle). These beverage dispensers are generally configured to work with proprietary single serve beverage cups or other beverage medium (e.g., coffee grinds) placed into a beverage medium receptacle (e.g., coffee filter).

Additionally, single serving and other format beverage dispensers generally require a pump or other pressure generation system in order to move water from a reservoir into and through their dispensing system. These pumps or other pressure generation components are generally mechanical in nature and subject to wear and tear. Over time, these components wear out, requiring replacement at additional cost or otherwise requiring the entire dispenser to be replaced.

In addition to requiring refilling of a water supply, these beverage dispensers are generally configured to reside on a countertop or other similar surface. These beverage dispensers are generally large and end up utilizing counter space that could be utilized for other purposes. Since each beverage dispenser requires its own beverage production elements (e.g., heating element, pump, water reservoir, dispensing unit and beverage receptacle area, the space taken up is inefficient as multiple beverage dispensers may be required to satisfy the demands of a single household (e.g., coffee maker, espresso machine, water filtering dispenser, hot water dispenser).

2

Many of the beverage dispensers currently on the market utilize single serving beverage mediums, such as single serving brew cups. Some of these beverage mediums have been configured to be reusable, providing consumers a means to use and refill their choice of beverage media via a single serve beverage medium. Many of the reusable beverage mediums function in the same manner as a disposable beverage medium, except that these reusable beverage mediums generally utilize a body with integral screen and removable lid to allow for changing beverage media in between uses. Some designs allow liquid to form a vertical channel through the beverage media while others distribute the liquid horizontally through the media in an effort to improve homogenous saturation of beverage media. All designs however have a significant limitation and that is proper metering and distribution of liquid in and through the beverage media contained in the beverage medium to achieve desirable saturation and extraction. Lack of distribution of the liquid also results in diminished brew time, which negatively effects saturation, extraction and flavoring of the brewed beverage.

Disposable cups currently on the market provide a convenient means to dispense beverage media. A popular packaging method has been to use a body having solid construction generally formed by thin plastic, filter media to contain the beverage media and seal media at top of the disposable cup to provide an air-tight configuration. In operation a sharp inlet nozzle of a beverage dispenser penetrates the seal media for entry of liquid into the cup and a sharp outlet nozzle of the beverage dispenser either penetrates the same seal media or the cup bottom, opposite side of internal filter, to extract the processed beverage from the cup. Metering is accomplished by appropriate sizing of the nozzles. There are several disadvantages to this process: (i) when packaged in an airtight enclosure beverage media, such as coffee, cannot be freshly packed; (ii) pressure buildup from gassing or altitude may impact dispenser performance—for instance use of prior art beverage medium cups at high altitudes may require the inconvenience of pre-puncturing cups and decreased brewing temperatures that will negatively impact extraction and flavoring of the brewed liquid); (iii) some designs inject liquid vertically creating vertical columns within the beverage media while peripheral beverage media is not proportionally saturated in the brewing process; (iv) filter media requires additional components and a secondary process for its installation; (v) in some cases filter media, such as bleached paper, can impact quality and purity of brewed beverage affecting taste and potentially introduce toxins such as Dioxin; and (vi) saturation and extraction of beverage media is not always uniform.

Other beverage mediums exist that do not use a cup like body, but rather utilize a simple filter media. The problem with beverage mediums of this format is that there is practically no metering and as a result a much bolder beverage media blend must be used. These beverage mediums also do not address proper water distribution ensuring saturation for effective extraction. Also, these beverage mediums must be packed in secondary airtight packaging which adds cost and waste. Once the secondary packing is opened the cups must be promptly used as oxygen is introduced and will quickly oxidize the beverage media.

Further, with respect to disposable cups, there are no disposable beverage mediums in the current art that provide for the use of de-gassing valves. Since these beverage mediums do not provide for de-gassing, they cannot be packed with fresh beverage media as fresh beverage media (e.g., roasted coffee grinds) require de-gassing when packed fresh. De-gassing valves are commonly used for packaging of coffee, allowing packaging of roasted coffee right away, but this has not been applied to sealed single serve beverage mediums nor have they doubled up providing a path for brewed liquid to exit. Further, no sealed single serve beverage mediums utilize an integrated filter as part of the construction of the beverage medium body. When viewed in light of the need for de-gassing and dispensing, generally, the construction of traditional de-gassing valves does not lend well to application on sealed single serve beverage mediums.

There is therefore a need in the art for an integrated hybrid water and beverage dispenser and brewing cups for use therewith. These and other features and advantages of the present invention will be explained and will become obvious to one skilled in the art through the summary of the invention that follows.

SUMMARY OF THE INVENTION

Accordingly, it is an aspect of the present invention to provide an integrated hybrid water and beverage dispenser and brewing cups for use therewith. Embodiments of the present invention provide an apparatus capable of dispensing water and other beverages through single serving or similar brewing containers. Preferred embodiments of the present invention are configured to be integrated within, on, upon or in conjunction with an existing pressurized water source, such as municipal water source, well water source or other residential or commercial pressurized water system.

According to an embodiment of the present invention, an integrated hybrid water and beverage dispenser apparatus, said apparatus comprising: a water supply unit, comprising a heating element, reservoir tank, data transmission connection port, water inlet port and water outlet port; a faucet head assembly, comprising a control element, a lid component, a water supply line, a data transmission cable, a beverage medium compartment and a faucet head stem, wherein said water supply line of said faucet head assembly passes through a channel formed in said faucet head stem and connects to said water outlet port of said water supply unit such that liquid may travel between said water supply unit and said beverage medium compartment, wherein said data transmission cable of said faucet head assembly passes through said channel formed in said faucet head stem and connects to said data transmission connection port of said water supply unit and provides for transmission of data between said water supply unit said control element of said faucet head assembly, wherein said faucet head stem is configured to extend through a surface and be secured thereupon by way of a securing element, and wherein said control element comprises a human interface device configured to allow input from a user, wherein said input effects control of said faucet head assembly such that water is allowed to be heated by said heating element and received from said reservoir tank through said water supply line and into said beverage medium compartment and out through a beverage dispensing port on said beverage medium compartment.

According to an embodiment of the present invention, the human interface device is a touch screen display that also provides one or more graphical user interfaces to a user.

According to an embodiment of the present invention, the water is received into said lid component prior to receipt into said beverage medium compartment and provided into said beverage medium compartment via a water delivery needle.

According to an embodiment of the present invention, the lid component is comprised of a hinge element allowing for the movement of the lid component between two or more states, a first state being a closed state in which a seal is formed between said lid component and said beverage medium compartment wherein the transmission of the water may occur, and a second state being an open state in which the lid component is at a point distal from said beverage medium compartment wherein a beverage medium may be removed or inserted into said beverage medium compartment and wherein said transmission of the water is restricted.

According to an embodiment of the present invention, the movement of said lid component between said first state and said second state is detectable by said control component via one or more lid state sensors.

According to an embodiment of the present invention, the lid state sensor is a Hall Effect sensor comprising a first Hall Effect sensor portion integrated in said faucet head assembly and a second Hall Effect sensor portion integrated into said lid component.

According to an embodiment of the present invention, the lid component further comprises a tension means configured to favor said lid component into said second state.

According to an embodiment of the present invention, the lid component further comprises a dampener configured to control a speed at which a lid component moves from said first state into said second state.

According to an embodiment of the present invention, the lid component further comprises a locking element configured to mate with a complimentary locking element on said faucet head assembly, the pairing of locking elements configured to retain said lid component in said first state.

According to an embodiment of the present invention, the water supply unit further comprises a water filtering unit configured to receive water from said water inlet port and purify said water prior to transmitting said water to said reservoir tank.

According to an embodiment of the present invention, the heating element is integrated with said reservoir tank and provides for the heating of water in said reservoir tank for use in said faucet head assembly.

According to an embodiment of the present invention, the water supply unit further comprises one or more sensors for determining sensor data about water in said water supply unit, wherein said sensor data is transmitted over said data transmission cable and provided to said control element for providing information to the user of the control element.

According to an embodiment of the present invention, the sensors include at least one temperature sensor and said sensor data comprises water temperature data.

According to an embodiment of the present invention, the sensors include at least one flow sensor and said sensor data comprises water flow data.

According to an embodiment of the present invention, the beverage medium compartment is removably attachable to said faucet head assembly.

According to an embodiment of the present invention, the water delivery needle is integrated into said lid component and provides water into an inlet spout integrated into a lid of a beverage medium cup contained in said beverage medium compartment, whereby water is injected through said inlet spout and through angular elongated slots in said lid of said beverage medium cup into a beverage medium cup body whereby the water is forced to swirl in one direction providing for contact with a beverage media contained in said beverage medium cup.

According to an embodiment of the present invention, the beverage medium cup further comprises a mesh being appropriately sized and metering vanes which interface between a bottom of the beverage medium cup and the beverage medium compartment such that water saturated with flavorings from the beverage media is allowed to pass through the mesh and out through a beverage outlet port of said beverage medium compartment.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

DETAILED SPECIFICATION

Figure 1:
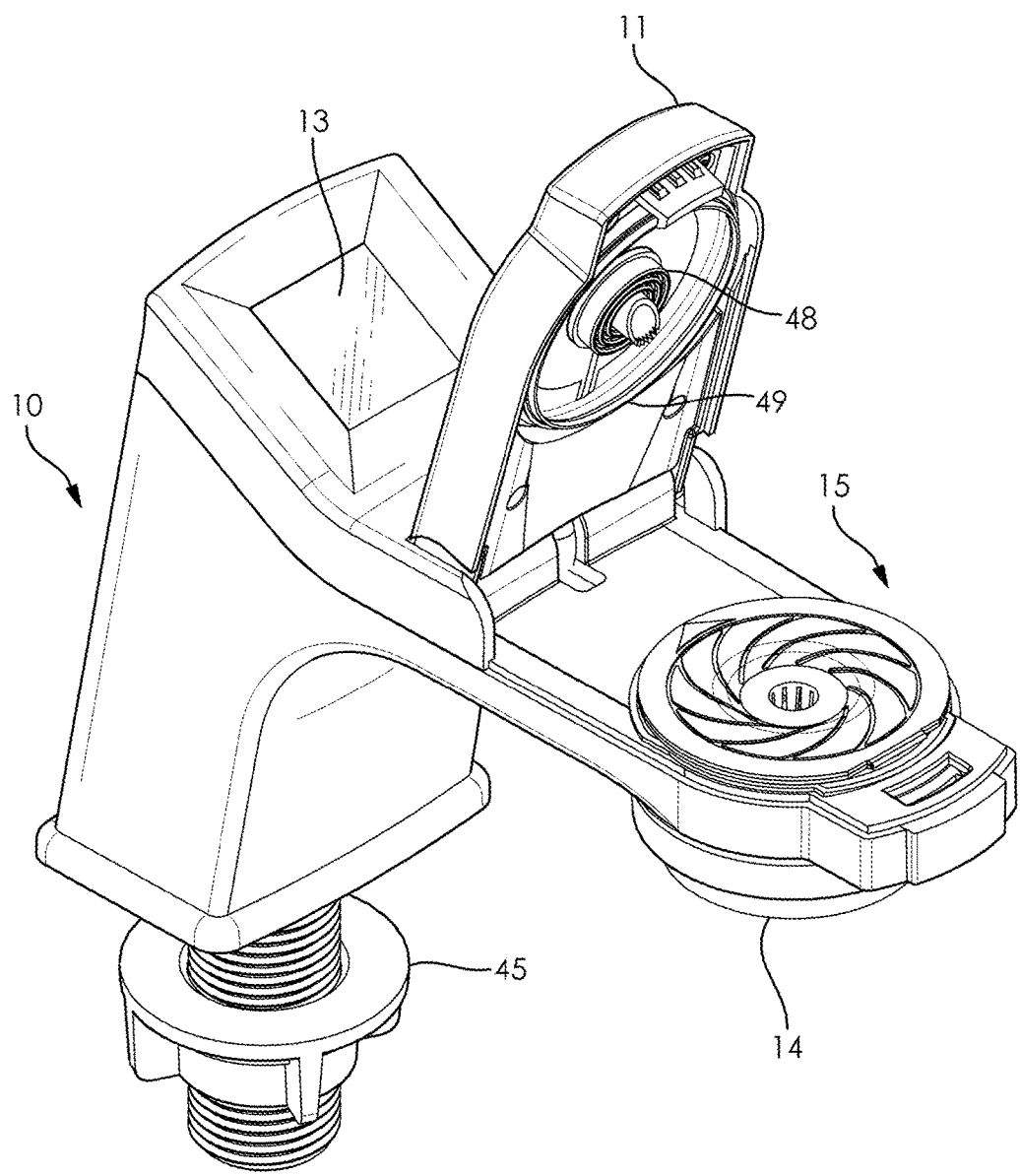
FIG. 1 is a perspective view of a dispenser head of an integrated hybrid water and beverage dispenser assembly with a lid component in an open position, in accordance with an embodiment of the present invention.
Figure 2:
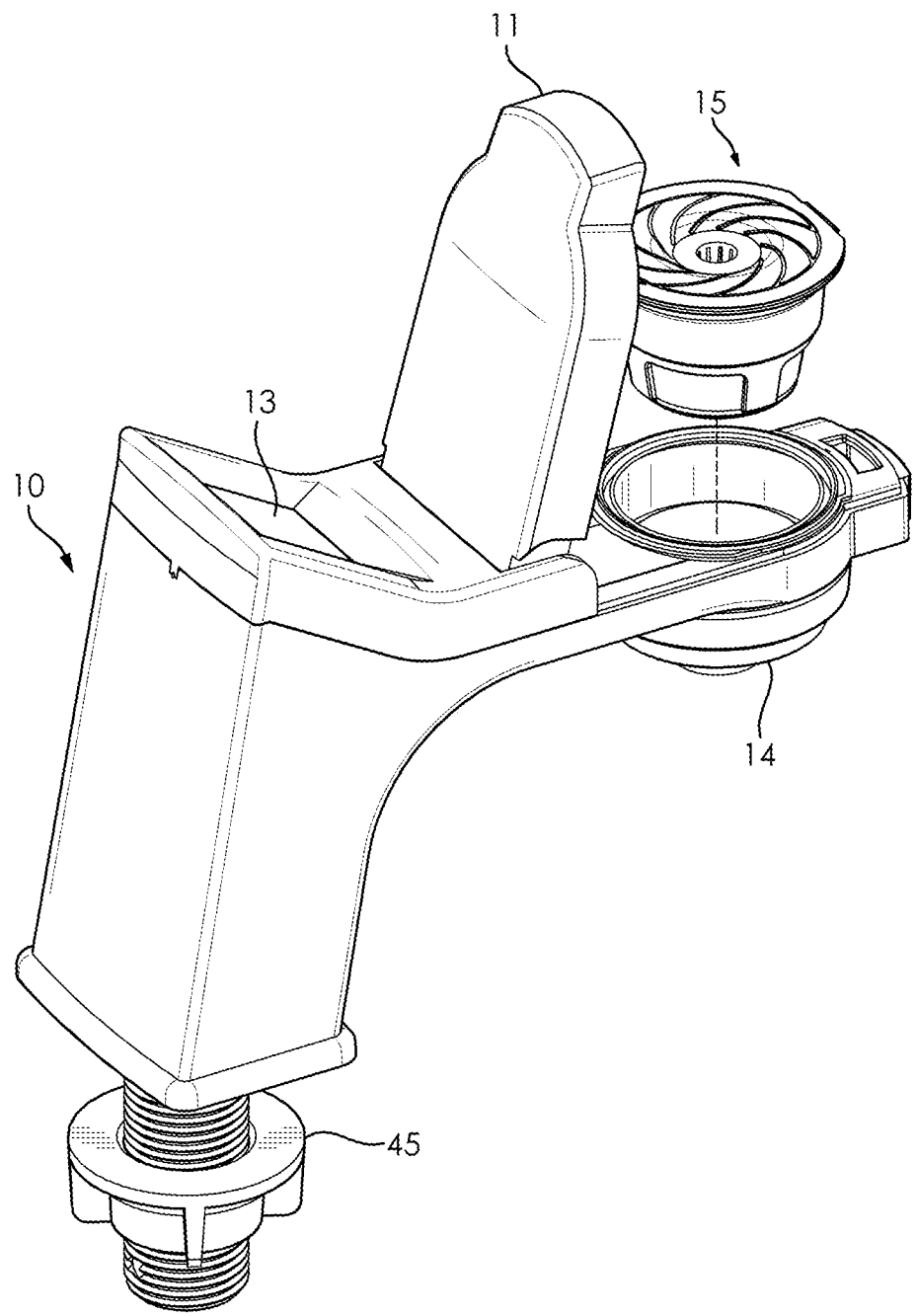
FIG. 2 is a rear perspective view of a dispenser head of an integrated hybrid water and beverage dispenser assembly and beverage medium, in accordance with an embodiment of the present invention.
Figure 3:
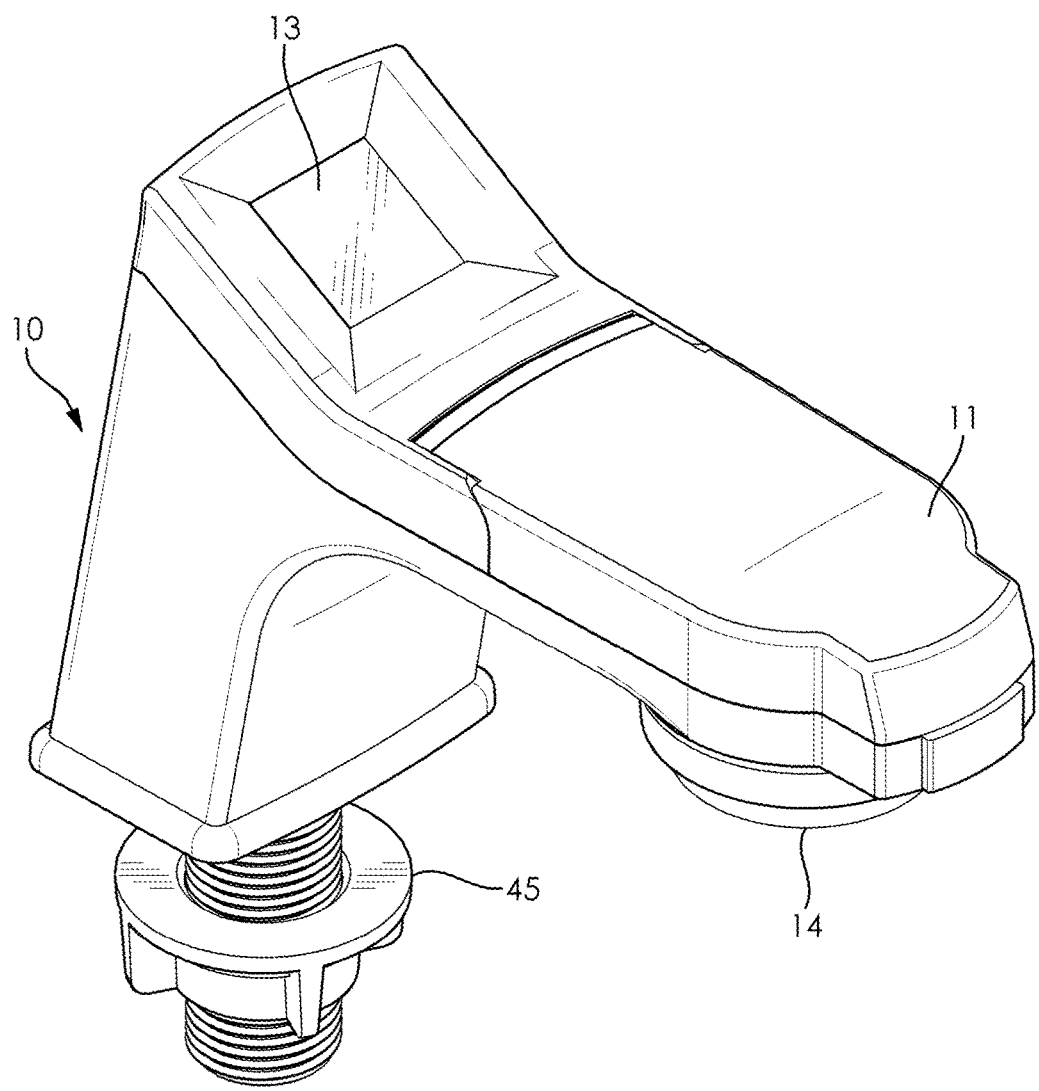
FIG. 3 is a perspective view of a dispenser head of an integrated hybrid water and beverage dispenser assembly with a lid component in a closed position, in accordance with an embodiment of the present invention.
Figure 4:
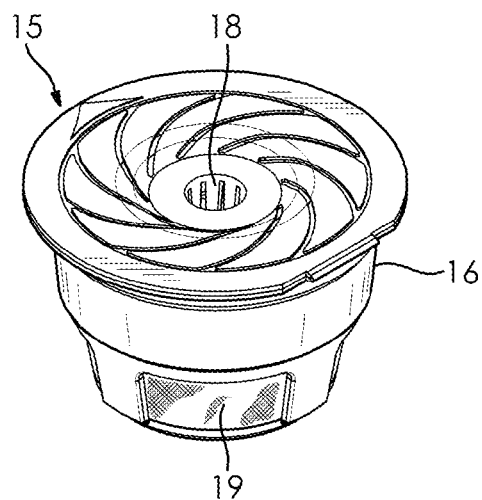
FIG. 4 is a perspective view of a beverage medium in a closed position, in accordance with an embodiment of the present invention.
Figure 5:
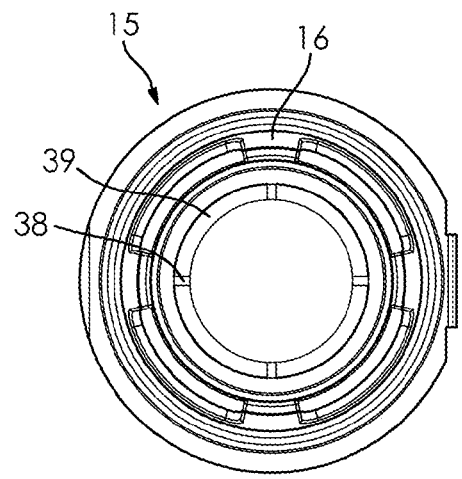
FIG. 5 is a bottom view of a beverage medium, in accordance with an embodiment of the present invention.
Figure 6:
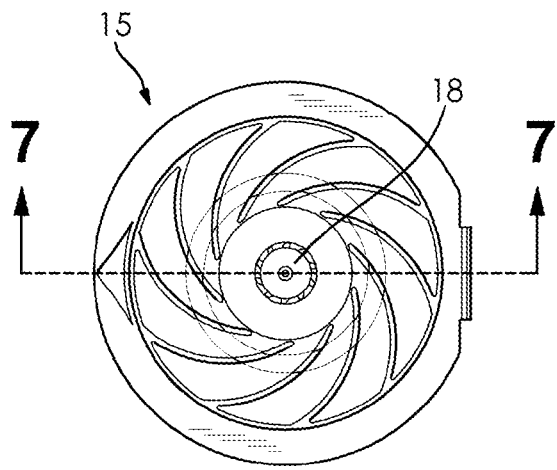
FIG. 6 is a top view of a beverage medium, in accordance with an embodiment of the present invention.
Figure 7:
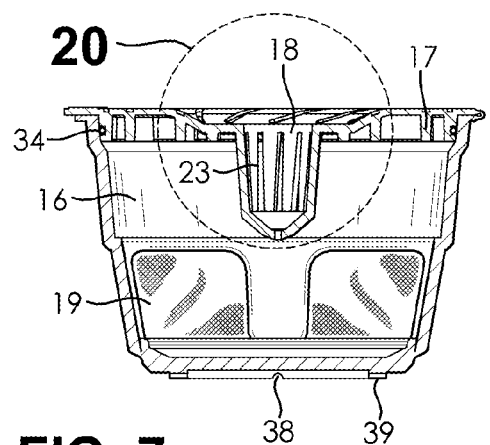
FIG. 7 is a cross-sectional side view of a beverage medium, in accordance with an embodiment of the present invention.
Figure 8:
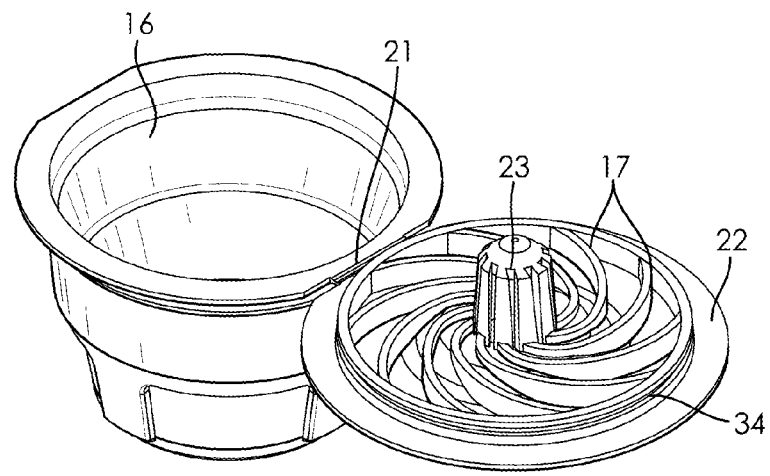
FIG. 8 is a perspective view of a beverage medium in an open position, in accordance with an embodiment of the present invention.

The present invention relates to the field of beverage dispensers. Specifically, embodiments of the present invention provide an apparatus capable of dispensing water and other beverages through single serving or similar brewing containers. Preferred embodiments of the present invention are configured to be integrated within, on, upon an existing sink or water basin and operate in conjunction with an existing water source, such as municipal pressurized water source, well water source or other residential or commercial pressurized water system.

According to an embodiment of the present invention, a purpose of the invention is to provide a consolidated, convenient and self-contained means of dispensing instant hot water or single serve brewed beverages, providing consumers a variety of choices in terms of beverage selection as well as dispensing features and brew functionality. In a preferred embodiment of the present invention, the integrated hybrid water and beverage dispenser apparatus (herein interchangeably referred to as the "apparatus" for the purpose of brevity), is a counter or water basin mounted, permanently plumbed, instant hot water dispenser with a unique faucet head that accepts one or more single serve refillable or disposable beverage mediums. Beverage mediums may include, but are not limited to, individual beverage preparation "cups", such as standard market available cups (e.g., K-CUP) and proprietary single serve disposable or refillable multi-use beverage media cups. The term "beverage medium" and "beverage medium cup" as used herein may be used interchangeably. One of ordinary skill in the art would appreciate that there are numerous types of beverage mediums that could be utilized with embodiments of the present invention, and embodiments of the present invention are contemplated for use with any appropriate beverage medium.

As used herein, the term "disposable" refers to beverage mediums that are single use or are generally configured for a limited number of uses. For example, single use, or disposable beverage mediums may include seals or other components that may be torn, pierced or otherwise damaged through the standard utilization of the beverage medium, rendering further use of the beverage medium impossible or impractical.

According to an embodiment of the present invention, the faucet head assembly 10 of the apparatus is coupled to a water supply unit for the provision of an integrated plumbed pressurized water source. Embodiments of the water supply unit may include a water filtering unit 25, a heating element 27, a reservoir tank 26, a water line connection (e.g., inlet port 24) and a faucet head connection. Embodiments of the water supply unit may further include a control unit, a power supply and a wiring harness for providing electrical and or data connections between the water supply unit and the faucet head assembly 10.

In a preferred embodiment of the present invention, a water supply unit may be comprised of a reservoir tank 26, a heating element 27, one or more electric solenoids, one or more pressure relief valves, one or more pressure regulators, one or more water flow sensors, a water filtering unit 25 comprising one or more filter cartridges, a thermistor, a thermostat, a water level sensor, an air pump, one or more backflow valves, one or more relays, a wiring interface connector and a plurality of inlet and supply fittings. This preferred embodiment of the present invention is intended to be contained in a single enclosure and designed to be conveniently mounted under a counter, such as counter or cabinet below a wash basin or sink.

In operation, the water supply unit is configured to receive water from a plumbed pressurized water supply, such as a water line attached to a fresh water system (e.g., cold water input line from either a well or city water source). The water line, generally the cold water line, but embodiments may also use a hot water line, may connect via a standardized connector to an inlet port on the water supply unit. In certain embodiments, the inlet port 24 may also comprise a cutoff valve or switch allowing for the closure of the inlet when elements of the apparatus or the water supply unit need servicing.

In a preferred embodiment, the inlet port 24 will introduce the water from the fresh water system into a water filtering unit 25 for filtering of particulate and other harmful flora. The water filtering unit may include one or more filter cartridges for this purpose. Filter cartridges may include, but are not limited to, carbon filters, media filters, screen filters, disk filters, sand filters, cloth filters, biological filters or any combination thereof. In a preferred embodiment of the present invention, the filter cartridges may be replaceable after a certain useful life of the filter has expired. In these preferred embodiments, a module or other control element of the apparatus may monitor the life of a filter cartridge and provide notifications to users regarding the replacement or other maintenance with respect to the filter cartridge. Such monitoring could be done based on an actual analysis of the cartridge (e.g., actual wear or depletion of the filtering elements) or based on time or usage of the apparatus since last a filter cartridge was replaced. One of ordinary skill in the art would appreciate that there are numerous types of filter cartridges that could be utilized with embodiments of the present invention, and embodiments of the present invention are contemplated for use with any appropriate type of filter cartridge.

In certain embodiments of the present invention, the water filtering unit may be removed or not present. For instances, in water systems where filtration is provided prior to interaction with the apparatus (e.g., whole home water filtration systems) or where no filtration is desired (e.g., reduce overall cost of the apparatus), embodiments of the apparatus may be designed and provided for without any built-in water filtering unit. In other embodiments, the water filtering unit may be detachable, allowing for use where desired and removal where undesirable.

According to an embodiment of the present invention, whether the apparatus provides for a water filtering unit or not, the water will move through the apparatus to a reservoir tank. The reservoir tank is configured to store and provide quick and convenient access to hot water for use by the apparatus and deliverable to the faucet head. Before entering the reservoir tank, water may pass through a flow meter configured to determine the amount of water entering the tank and one or more solenoids.

According to an embodiment of the present invention, the flow meter is configured to determine an amount of water that is passing through the water line and into the reservoir. The determination of the amount of water may be used in calculations made by the apparatus with respect to delivery of water at the faucet head. For instance, with respect to beverage size, input received from the flow meter can be provided to calculate the amount of liquid dispensed at the faucet head in order to allow users to select the dispensing of various beverage sizes. If a user requests a 12 oz. beverage, the faucet head can dispense fluid until the flow meter determines that 12 oz. of fluid has passed through the flow meter. While the present description details positioning of the flow meter prior to the reservoir tank, other embodiments may have a flow meter after the reservoir tank (e.g., in between reservoir tank and the faucet head) or multiple flow meters placed in series or parallel, such as for use in verifying accuracy of the water flow at various points in the system. One of ordinary skill in the art would appreciate that there are numerous types and usages for flow meters in embodiments of the present invention, and embodiments of the present invention are contemplated for use with any appropriate type and usage of flow meters.

According to an embodiment of the present invention, the one or more solenoids may be utilized to allow and restrict flow of water from the water supply to the reservoir tank. In a preferred embodiment of the present invention, the one or more solenoids are controlled by electrical or mechanical means and are generally controlled in conjunction with operable components of the apparatus (e.g., control means at the reservoir tank or faucet head configured to initiate and terminate water flow). One of ordinary skill in the art would appreciate that there are numerous types of solenoids and solenoid control means that could be utilized with embodiments of the present invention, and embodiments of the present invention are contemplated for use with any appropriate type of solenoid and solenoid control means.

According to an embodiment of the present invention, once the water enters the reservoir tank, a heating element 27 is engaged to raise the temperature of the stored water to a desired level. Heating elements may include, but are not limited to, metal heating elements, ceramic heating elements, composite heating elements, or any combination thereof. One of ordinary skill in the art would appreciate that there are numerous types of heating elements that could be utilized with embodiments of the present invention, and embodiments of the present invention are contemplated for use with any appropriate heating element.

In certain embodiments of the present invention, an inline heating element may be utilized and not require a reservoir tank at all (i.e., tankless water heating system). In these embodiments, the water provided by the pressurized water supply is pushed through pipes or other fluidic pathways that heat the liquid prior to it being received by the faucet head assembly 10. The water may be still passed through a water filtering unit prior to receipt into the heated fluidic pathways (i.e., heating element).

According to an embodiment of the present invention, the heating element 27 is connected to a power supply capable of supplying current required to generate adequate power to the heating element. The heating element 27 may further be operably connected to one or more of a control element and a thermostat or other temperature monitoring element. The control element may be configured to manage when the heating element is engaged to heat the water in the tank and may work in conjunction with the thermostat or other temperature monitoring element in order to maintain or acquire the appropriate temperature water for use in the brewing of a beverage as requested by a user of the apparatus. One of ordinary skill in the art would appreciate that there are numerous types of thermostats and/or temperature monitoring elements that could be utilized with embodiments of the present invention, and embodiments of the present invention are contemplated for use with any appropriate type of thermostat or temperature monitoring elements.

According to an embodiment of the present invention, the thermostat and/or other temperature monitoring elements may be further configured to provide safety or emergency cutoff procedures. For instance, the thermostat or other temperature monitoring element may be utilized to detect unsafe temperature levels, causing a fuse or other element to cut power to the heating element in order to prevent continued unsafe levels of temperature or overheating of the heating element.

According to an embodiment of the present invention, the reservoir tank may further be comprised of one or more pressure release valves. The pressure release valves allow for pressure to be released due to expansion caused by increasing temperatures within the reservoir tank. One of ordinary skill in the art would appreciate that there are numerous types of pressure release valves that could be utilized with embodiments of the present invention, and embodiments of the present invention are contemplated for use with any appropriate type of pressure release valve.

According to an embodiment of the present invention, the water in the reservoir tank may be provided to the faucet head of the apparatus by way of a faucet water line 30. The faucet water line 30 travels from the reservoir tank to the faucet head assembly 10 and may pass through a channel provided in a faucet head stem 12 of the faucet head assembly 10 to reach the operable components of the faucet head. In a preferred embodiment, also passing through the channel in the faucet head stem 12 is a wiring harness, comprising one or more of a data transmission cable, power transmission cable or any combination thereof (collectively, cables 28). Data transmission cables may be one or more of a proprietary data transmission means, Ethernet cable, fiber optic cable, serial data cable, parallel data cable or any combination thereof. One of ordinary skill in the art would appreciate that there are numerous types of data transmission cables that could be utilized with embodiments of the present invention, and embodiments of the present invention are contemplated for use with any appropriate data transmission cable. In other embodiments, data transmission between the faucet head and the reservoir tank may be provided by one or more wireless communications means (e.g., BLUETOOTH communication means, WIFI communications means, near field communication (NFC) means, radio frequency identification (RFID) communications means).

According to an embodiment of the present invention, the faucet head assembly 10 may comprise one or more circuit boards, microcontrollers, touch screen displays 13, control circuitry, liquid supply tubing, seals, water delivery needle, air pump, beverage medium compartment 14, sensing devices (e.g., to detect presence of a beverage medium, to detect the position of the beverage medium in the beverage medium compartment 14), faucet water line, faucet head stem 12 and wire harness for interconnection to tank assembly. In a preferred embodiment, all components of the faucet head assembly 10 are housed in a single enclosure designed to be conveniently mounted to a counter, sink basin or other similar surface. Further, in preferred embodiments, gaskets or seals may be utilized in conjunction with the faucet head stem 12 and placed either above, below or both a surface of the sink or other basin the faucet head stem 12 extends through in order to provide a water tight seal between the faucet head stem 12 and surfaces of the sink or other water basin. One of ordinary skill in the art would appreciate that there are numerous types of gaskets, seals and sealing materials that could be utilized for this purpose, and embodiments of the present invention are contemplated for use with any appropriate type of gasket, seal or other sealing material.

According to an embodiment of the present invention, the channel in the faucet head stem 12 is configured to allow for the passage of the faucet water line and wire harness to pass through a counter or similar surface and, in conjunction with walls forming the channel, provide for secure mounting of the faucet head assembly 10 to the counter or similar surface. In a preferred embodiment, the walls of the faucet head stem 12 forming are cylindrical and hollowed enough to allow for the channel allowing for the passage of the faucet water line and data transmission cables as described herein, and further comprise a threaded bottom end, allowing for receipt of a nut 45 or other securing element to retain the entire faucet head assembly 10 in place upon the counter or other surface. When utilizing a nut 45 or other securing element, the faucet head assembly 10 is retained in place by a friction, interference, or other mechanically secured fit between the securing means (being retained upon the faucet head stem 12) and a portion of the counter or other surface. One of ordinary skill in the art would appreciate that there are numerous types of securing means that could be utilized with embodiments of the present invention, and embodiments of the present invention are contemplated for use with any appropriate securing means. In other embodiments, the faucet head assembly 10 may be secured to a counter or other surface by one or more of adhesives, permanent connections (e.g., welds, rivets) or other securing means. In still further embodiments, the faucet head assembly 10 could be integrated into or integrally formed upon a counter or other surface, such as a sink basin, and installed as a single component with the counter or other surface.

According to an embodiment of the present invention, a main portion of the faucet head assembly 10 extends above a counter or other surface and incorporates a control element and a beverage dispenser element. The control element generally comprises components allowing for the control and operation of the various aspects of the beverage dispenser element, such components including one or more of a circuit board, microcontroller, control circuitry and a human interface device (HID) (e.g., touch screen display 13). Together, these control elements allow a user to select various operations for the apparatus to perform. Operations include, but are not limited to, dispensing of hot water, dispensing of a specified amount of hot water, dispensing of an amount of hot water to be used in conjunction with a beverage medium, setting of a water temperature, setting a time/date, setting a beverage container size, providing alerts (e.g., head positioning alerts (open/closed), remove cartridge alerts, heating alerts, dispensing alerts), selection of a brew size, setting of beverage brew body, integral stopwatch and timer for convenience of consolidation, selection and/or engagement of a cleaning cycle, or any combination thereof. One of ordinary skill in the art would appreciate that there are numerous types of operations that could be utilized with embodiments of the present invention, and embodiments of the present invention are contemplated for use with any appropriate operation type.

According to an embodiment of the present invention, the control element may further include or communicate with one or more sensing devices. Sensing devices include sensors that are capable of detecting certain features or attributes of the apparatus and various states of operation. For instance, a sensing device may include a sensor for detecting the position of a lid component 11 (e.g., open, closed). Appropriate sensors for detecting positioning of a lid component 11 could include a Hall Effect sensor, with a portion of the sensor on the lid component 11 and a second paired component on the beverage compartment of the faucet head assembly 10. Other sensors include, but are not limited to, temperature sensors, infrared sensors, air flow sensors, water flow sensors, pressure sensors, or any combination thereof. One of ordinary skill in the art would appreciate that there are numerous types of sensors that could be utilized with embodiments of the present invention, and embodiments of the present invention are contemplated for use with any appropriate sensor type.

According to an embodiment of the present invention, the control element allows for user interaction therewith through a HID. In a preferred embodiment, the HID is a touch screen TFT panel, allowing for the user to interact with graphical user interfaces (GUIs) presented on the HID by touching appropriate locations on the TFT panel. In other embodiments, the HID could include, but is not limited to, one or more of a capacitive touch screen, keypad or a series of buttons or other interactive elements (e.g., switches, knobs), or any combination thereof. One of ordinary skill in the art would appreciate that there are numerous types of HIDs that could be utilized with embodiments of the present invention, and embodiments of the present invention are contemplated for use with any appropriate type and combination of HIDs.

According to an embodiment of the present invention, the beverage dispenser element of the faucet head assembly 10 is operably connected to and controlled by the control element. In preferred embodiments, the beverage dispenser element extends over a sink or other basin for collection of water such that any excess water or otherwise unutilized beverage or other liquid that exits from the apparatus is collected in an appropriate container. Generally, this is a sink or other basin connected to a sewage or other waste water system.

According to an embodiment of the present invention, the beverage dispenser element is comprised of a dispenser head, a beverage medium compartment 14 and a lid component 11. The dispenser head allows for passage of the faucet water line to extend from the faucet head assembly 10 outward into the lid component 11 for provision of water from the lid component 11 into the beverage medium compartment 14. In alternate embodiments, the water line may direct water through the faucet head into the beverage medium compartment 14 without extending into the lid component 11.

According to an embodiment of the present invention, the lid component 11 receives the faucet water line and allows for the passage of water through a water delivery needle 47. The water delivery needle 47 is configured to allow for the piercing of single serving beverage medium cups or use with reusable beverage medium cups and provision of water into the beverage medium cups. In certain embodiments, the water delivery needle 47 may be cut at an angle, allowing for water to be injected into the beverage medium cup in such a manner that will likely cause agitation and further saturation of the beverage media contained in the beverage medium cup. The cut angle of the delivery needle in the present embodiment is oriented to mitigate elongated tearing of a disposable cup seal media.

According to an embodiment of the present invention, the lid component 11 further comprises one or more seals, a locking component and a hinge element. The hinge element is configured to allow for the lid component 11 to move between and closed position (first state) and open position (second state). In certain embodiments, the hinge element may further comprise a tension means, such as a leaf spring, coil spring or other means for favoring the lid component 11 in a particular position (e.g., favoring an open position, favoring a closed position). In certain embodiments, one or more dampeners could be utilized to assist with controlling the speed at which the lid component 11 moves to the open position. In a preferred embodiment, a high viscosity silicone oil is used as dampener. One of ordinary skill in the art would appreciate that there are numerous types of dampeners that could be utilized with embodiments of the present invention and embodiments of the present invention are contemplated for use with any type of dampener. In certain embodiments, the tension means may be adjustable to further control speed at which lid opens. In a preferred embodiment, a coil spring is utilized to favor the lid component 11 in an open position (i.e., lid favoring an upright position extending above the beverage medium compartment 14. One of ordinary skill in the art would appreciate that there are numerous types of tension means that could be utilized with embodiments of the present invention, and embodiments of the present invention are contemplated for use with any appropriate tension means.

According to an embodiment of the present invention, the seals of the lid component 11 are configured to prevent water from escaping from the faucet head assembly 10 except through the desired pathway (i.e., through a lower portion of the beverage medium compartment 14). Seals (48, 49) may be positioned, for instance, on one or more of an outer ring (i.e., seal 49) around a portion of the lid component 11 that engages with an upper portion of the beverage medium compartment 14 and around an area proximate to the water delivery needle 47 (i.e., seal 48). Seals 48 near the water delivery needle 47 may be utilized to direct water into a desired channel of a beverage medium (e.g., proprietary beverage cup as described herein). Seals 49 near the outer ring around a portion of the lid component 11 provide sealing of the beverage medium compartment when the lid component 11 is engaged with the faucet head assembly 10. Advantageously, seals 49 prevent water escaping from the beverage medium compartment whether during brewing of a beverage or dispensing of water (e.g., when no beverage medium is inserted into the beverage medium compartment).

According to an embodiment of the present invention, the locking component of the lid component 11 is configured to mate or otherwise engage with a complementary locking component on the beverage medium compartment 14 or faucet head assembly 10 in order to retain the lid component 11 in a closed position during operation of the apparatus. Locking components may include, but are not limited to, interference fit locking elements (e.g., releasable by a button on the apparatus), magnetic locking elements, twist-lock locking elements, sliding locking elements, or any combination thereof. One of ordinary skill in the art would appreciate that there are numerous types of locking elements that could be utilized with embodiments of the present invention, and embodiments of the present invention are contemplated for use with any appropriate locking element type.

According to an embodiment of the present invention, the beverage medium compartment 14 is integrated on the faucet head assembly 10 and configured to receive the lid component 11 such that a water tight seal is formed between the beverage medium compartment 14 and the lid component 11. The beverage medium compartment 14 is configured to receive beverage mediums, such as beverage medium cups and other single serving or reusable beverage mediums. In preferred embodiments, the beverage mediums are retained in the beverage medium compartment 14 such that the water dispensing needle of the lid component 11 may work in conjunction with the retained beverage medium to allow for receipt of water into the beverage medium and allowed to pass through a lower portion of the beverage medium and beverage medium compartment 14 out an opening on the beverage medium compartment 14's lower side. This opening is for the provision of the beverage or hot water to be provided into a beverage container of the user's choice.

In certain embodiments, the beverage medium compartment 14 may be detachable from the faucet head assembly 10 such that various interchangeable beverage medium compartments 14 may be utilized. For instance, various sizes of beverage medium compartment 14s can be removably attachable to the faucet head assembly 10 in order to allow for usage with a variety of different sized beverage medium compartment 14s. In these embodiments, the beverage medium compartment 14 may further comprise a connection means, such as a threaded portion for screwing onto an appropriate mating component on the faucet head assembly 10, or a button release connection means and appropriate mating component on the faucet head assembly 10. One of ordinary skill in the art would appreciate that there are numerous types of connection means that could be utilized with embodiments of the present invention, and embodiments of the present invention are contemplated for use with any appropriate type of connection means. Further, in embodiments where a connection means is utilized, a portion of the beverage medium compartment 14 may be formed such that a tool (e.g., hexagonal wrench) could be utilized to disengage the connection means of the beverage medium compartment 14 from the mating component on the faucet head assembly 10.

Figure 14:
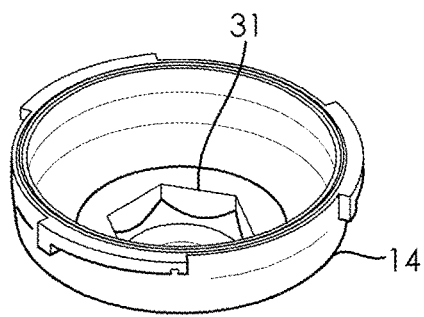
FIG. 14 is a top perspective view of a beverage medium compartment, in accordance with an embodiment of the present invention.
Figure 15:
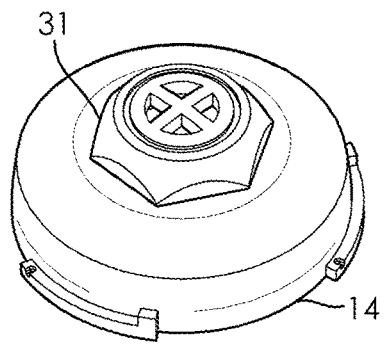
FIG. 15 is a bottom perspective view of a beverage medium compartment, in accordance with an embodiment of the present invention.

FIGS. 14-17 show exemplary embodiments of such detachable beverage medium compartments. FIGS. 14-15 are exemplary embodiments of a detachable beverage medium compartment that may be used with proprietary disposable and reusable beverage medium cups as described herein. FIGS. 14-15 further show the portion 31 of the detachable beverage medium compartment configured for interaction with a tool for disengaging the detachable beverage medium compartment from the faucet head assembly.

Figure 16:
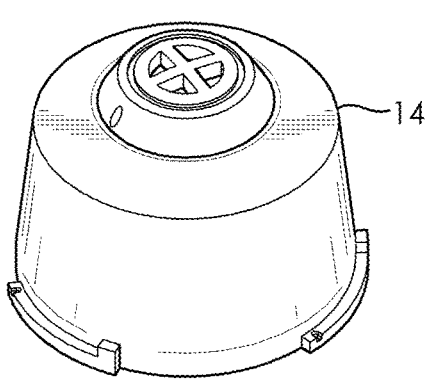
FIG. 16 is a bottom perspective view of a beverage medium compartment, in accordance with an embodiment of the present invention.
Figure 17:
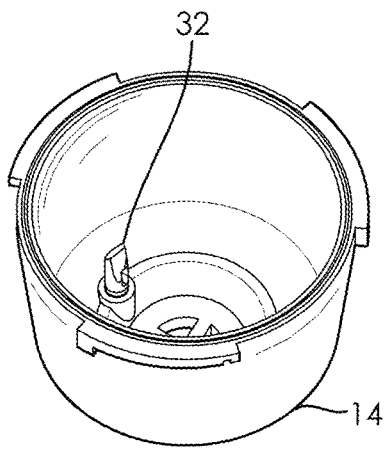
FIG. 17 is a top perspective view of a beverage medium compartment, in accordance with an embodiment of the present invention.
Figure 18A:
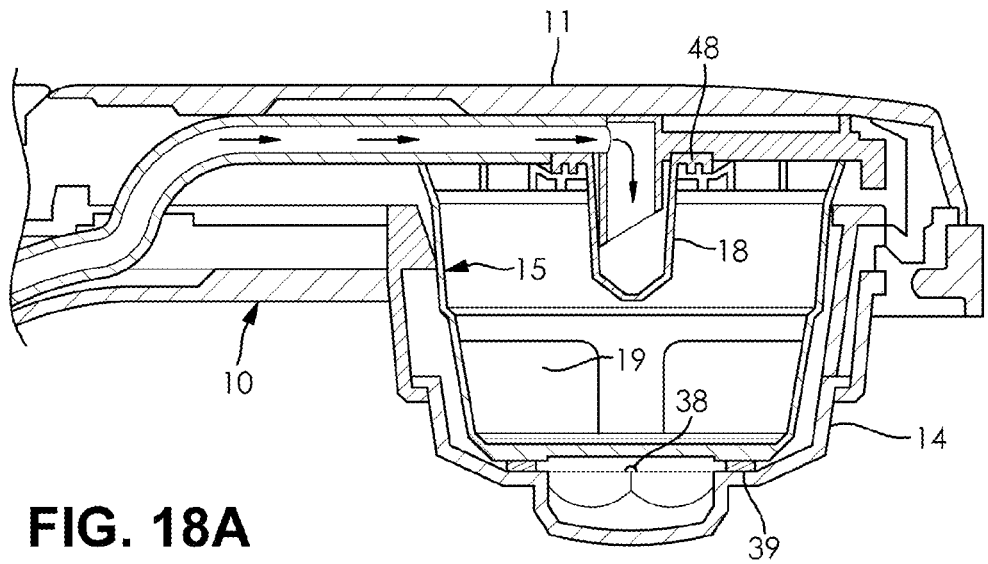
FIG. 18A is a cross-sectional side view of a dispenser head of an integrated hybrid water and beverage dispenser assembly, in accordance with an embodiment of the present invention.
Figure 18B:
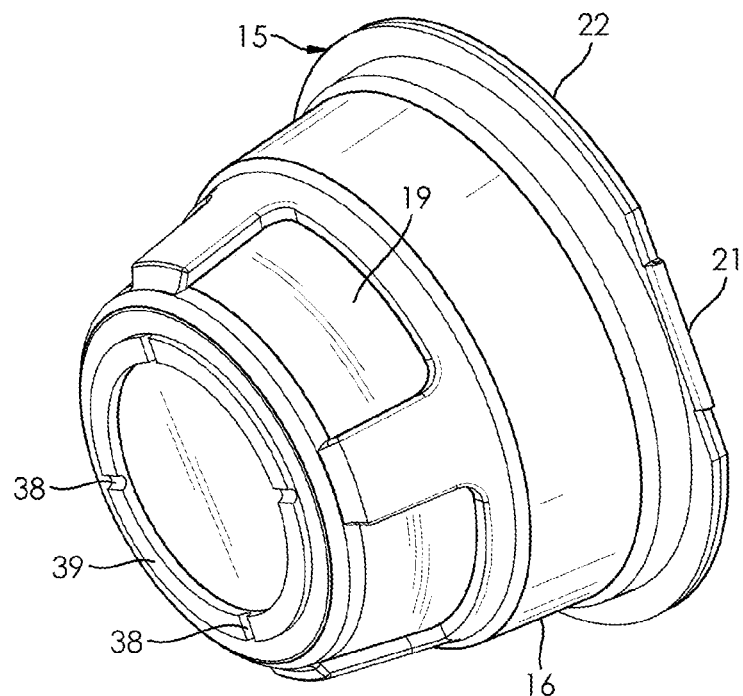
FIG. 18B is a lower perspective view of a beverage medium, in accordance with an embodiment of the present invention.

FIGS. 16-17 are exemplary embodiments of a detachable beverage medium compartment that may be used with standard beverage medium cups that require puncturing of a lower portion of the beverage medium cup to allow for flow of liquids there through. In the later embodiments, a needle 32 may be integrated or formed with the detachable beverage medium compartment in order to allow for use with these standard beverage medium cups. The needle 32 is formed with a cutout lower portion 32a (See, FIG. 19) to allow liquid to pass from the beverage medium cup 46 (See, FIG. 19) into a lower portion of the beverage medium compartment and out through the lower portion of the beverage medium compartment into a beverage container.

According to an embodiment of the present invention, an air pump may be used by the apparatus to purge remaining water in the water supply lines and/or water remaining in a beverage medium compartment 14 or beverage medium cup. In a preferred embodiment, this process occurs at the end of the brew cycle for a predetermined period of time (e.g., several seconds). The air pump feeds air past a check valve in the apparatus ensuring air pressure goes through the faucet head assembly 10 as opposed to back into the water reservoir tank. The air pump may be located either in the faucet head assembly 10 or with the water supply unit portion of the apparatus.

According to an embodiment of the present invention, the apparatus, and particularly the beverage medium compartment 14, can be configured to utilize proprietary beverage medium cups. Both refillable and disposable proprietary cups may be utilized with certain embodiments of the present invention.

According to an embodiment of the present invention, a refillable proprietary beverage medium cup 15 comprises a body 16 with integrated filtering screen 19, lid 22, sealing rib 39, and metering vanes 38, as shown in FIGS. 4-8, and 18A-18B. The lid 22 is designed to be opened for the removal and refilling of beverage media. In a preferred embodiment, the lid is attached to the beverage medium cup body 16 via an operable connection 21, such as a living hinge. Other operable connections include, but are not limited to, butt hinges, T-hinges, strap hinges, gate hinges, continuous hinges, pivoting connections (e.g., formed plastics), or any combination thereof. One of ordinary skill in the art would appreciate that there are numerous types of operable connections that could be utilized with embodiments of the present invention, and embodiments of the present invention are contemplated for use with any appropriate operable connections.

According to an embodiment of the present invention, the lid 22 may be further comprised of a lid seal 34, such as an O-ring, configured to provide reusable sealing of the lid to the beverage medium while preventing liquid and sediment to escape between the lid and body. This allows for refilling of beverage media and reuse of the beverage medium. One of ordinary skill in the art would appreciate that there are numerous types of lid seals that could be utilized with embodiments of the present invention, and embodiments of the present invention are contemplated for use with any appropriate type of lid seal.

According to an embodiment of the present invention, an inlet spout 18 is integrated into lid 22 whereby liquid (e.g., hot water from the lid component 11 of the apparatus) is injected through angular elongated slots 23 in inlet spout 18 and into a beverage medium cup body 16 whereby the liquid is forced to swirl in direction of the angular elongated slots 23. Ribs 17 integrated on bottom of lid 22 help the swirl effect by encouraging a circular motion of water let in through the angular elongated slots 23 of inlet spout 18. The swirl effect creates agitation which together mitigates channels being formed in beverage media and ensures desirable homogenous mixture of liquid and beverage media. In operation, a water deliver needle 47 located within the lid component 11 of the faucet head assembly 10 would be placed directly within the inlet spout 18. A seal ring 48 on the faucet head assembly 10 seals around the beverage medium cup lid 22 ensuring liquid does not backflow in an undesirable direction.

According to an embodiment of the present invention, mesh size of the integrated filtering screen 19 is optimized to both restrict dispensing of beverage media sediment and aid in the metering of brewed beverage media. Metering is further accomplished by restricting flow of brewed beverage media through metering vanes 38 being appropriately sized and sealing rib 38 which interfaces between the proprietary medium cup and floor of beverage medium compartment 14 forcing brewed beverage liquid to dispense through metering vanes 38 (See, FIGS. 18A-18B). Metering together with homogenous mixture optimizes saturation and extraction of brewed beverage liquid. One of ordinary skill in the art would appreciate that there are numerous methods for providing metered dispensing of brewed beverage liquid and embodiments of the present invention are contemplated for use with any appropriate method for providing metered dispensing of brewed beverage liquid.

According to an embodiment of the present invention, a disposable proprietary beverage medium cup assembly comprises a body 50 with integrated filtering holes 35, top insert 51, sealing media 33, and a one-way valve 40 or 52, as shown in FIGS. 13A-13B, and 21-22. The top insert 51 is designed to be placed within the beverage medium cup up on top of beverage media. A sealing media 33, such as foil or other material is affixed to top of beverage medium cup forming a permanent seal (See, FIGS. 21-22).

According to an embodiment of the present invention, an inlet spout 18 is integrated into the top insert 51 whereby liquid (e.g., hot water from the lid component 11 of the apparatus) is injected through angular elongated slots 23 in inlet spout 18 and into a beverage medium cup body 50 whereby the liquid is forced to swirl in direction of the angular elongated slots 23. Ribs 17 integrated on bottom of top insert 51 help the swirl effect by encouraging a circular motion of water let in through the angular elongated slots 23 of inlet spout 18. The swirl effect creates agitation which together mitigates channels being formed in beverage media and ensures desirable homogenous mixture of liquid and beverage media. In operation a water deliver needle 47 located within the lid component 11 of the faucet head assembly 10 would penetrate through the top seal media 33 placing the needle spout directly within the inlet spout 18 directly below. A seal ring 48 on the faucet head assembly 10 seals around the seal media 33 perforation ensuring liquid does not backflow in an undesirable direction.

According to an embodiment of the present invention, filtering holes 35 integrated into cup body 50 are optimally sized to both restrict dispensing of beverage media sediment and aid in the metering of brewed beverage liquid. Metering is further accomplished by head pressure before activating a one-way valve 40 or 52. Metering together with homogenous mixture optimizes saturation and extraction of brewed beverage liquid. In a preferred embodiment, each individual filtering hole 35 is shaped as a diamond so as to mitigate clogging by beverage media. One of ordinary skill in the art would appreciate that there are numerous shapes the filtering holes can take, and embodiments of the present invention are contemplated for use with any shaped hole.

Figure 13A:
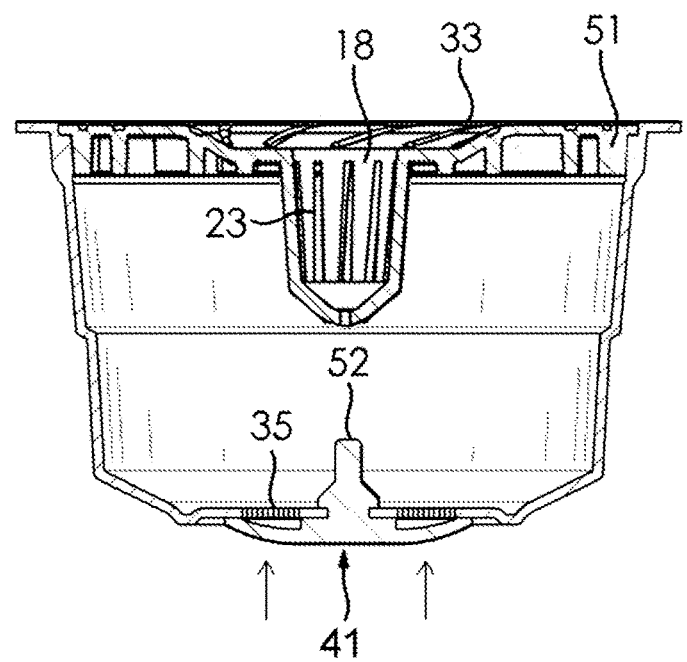
FIG. 13A is a cross-sectional side view of an umbrella seal attached to a beverage medium cup in an unactivated state, in accordance with an embodiment of the present invention.
Figure 13B:
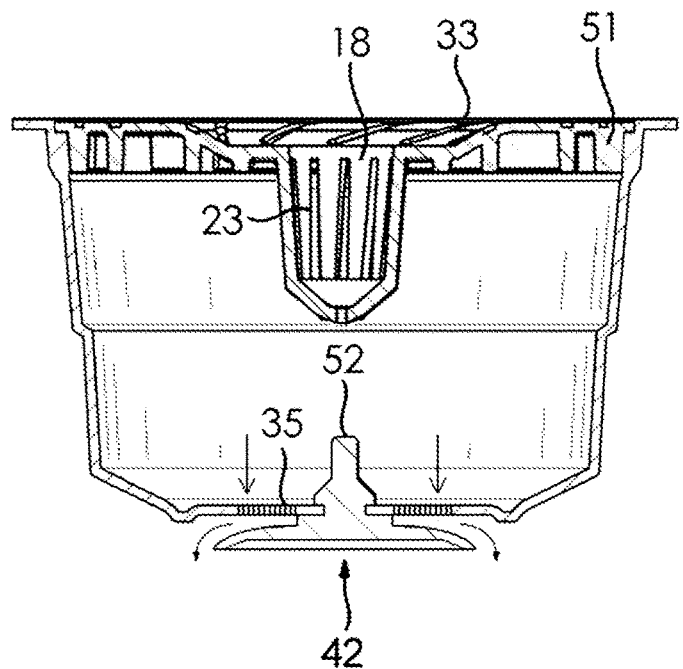
FIG. 13B is a cross-sectional side view of an umbrella seal attached to a beverage medium cup in an activated state, in accordance with an embodiment of the present invention.

According to an embodiment of the present invention, a unique integrated one-way valve 40 or 52 located at bottom of beverage medium cup provides both a de-gassing function and path for the brewed beverage liquid to exit. According to an embodiment of the present invention, the one-way valve can be, for instance, a seal type material (e.g., seal media 40) having a region around its perimeter permanently affixed to a bottom of the beverage medium cup 36. The seal type material further covers integrated filter holes 35 on said beverage medium cup with a center region having no filtering holes and a perforation in the seal media 40 center region 37 that is held in place (for instance, by high viscosity food grade silicone oil) against the center region 41 of the cup whereby head pressure in the cup via gasses or liquid separates the seal media center region 37 from center region 41 of the cup providing a path for gasses or liquid to escape from the filtering holes 35 and through the perforation 37 (See, FIG. 22). In an alternate embodiment, an elastomeric umbrella type valve 52 positioned over the filtering holes 35 could be utilized (See, FIGS. 13A-13B and 21). FIG. 13A for instance, shows an umbrella type valve 52 in use on a beverage medium cup when no brewing is occurring. A one-way seal is formed preventing oxygen from getting in. FIG. 13B shows the umbrella type valve in an open state, such as when de-gassing occurs or when liquid is being pushed through the beverage medium cup by the apparatus. One of ordinary skill in the art would appreciate that there are numerous methods for using one-way valves to provide for de-gassing and dispensing of brewed beverage liquid, and embodiments of the present invention are contemplated for use with any appropriate method for providing de-gassing and dispensing of brewed beverage liquid.

Figure 9:
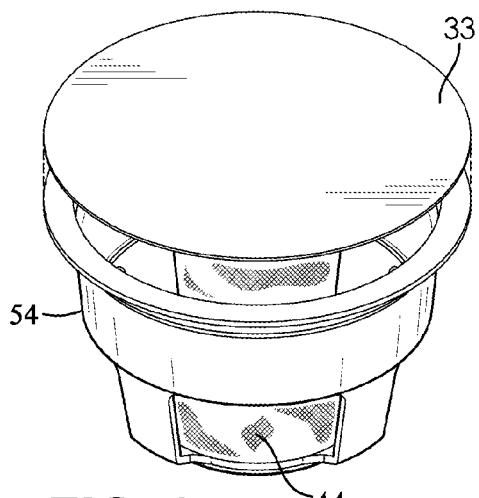
FIG. 9 is an exploded perspective view of a beverage medium, in accordance with an embodiment of the present invention.
Figure 10:
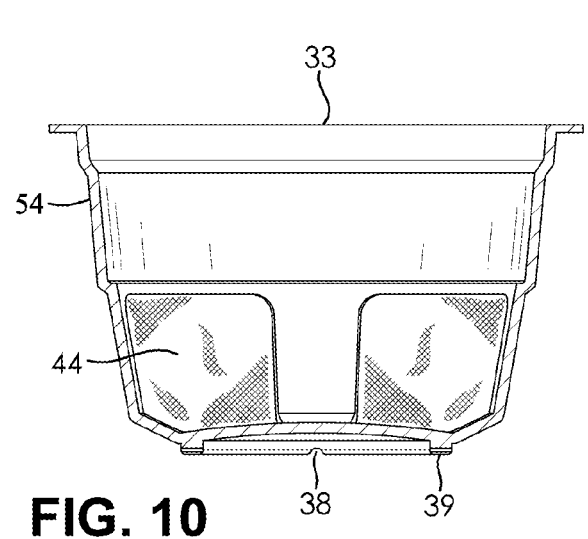
FIG. 10 is a cross-sectional side view of a beverage medium, in accordance with an embodiment of the present invention.
Figure 11:
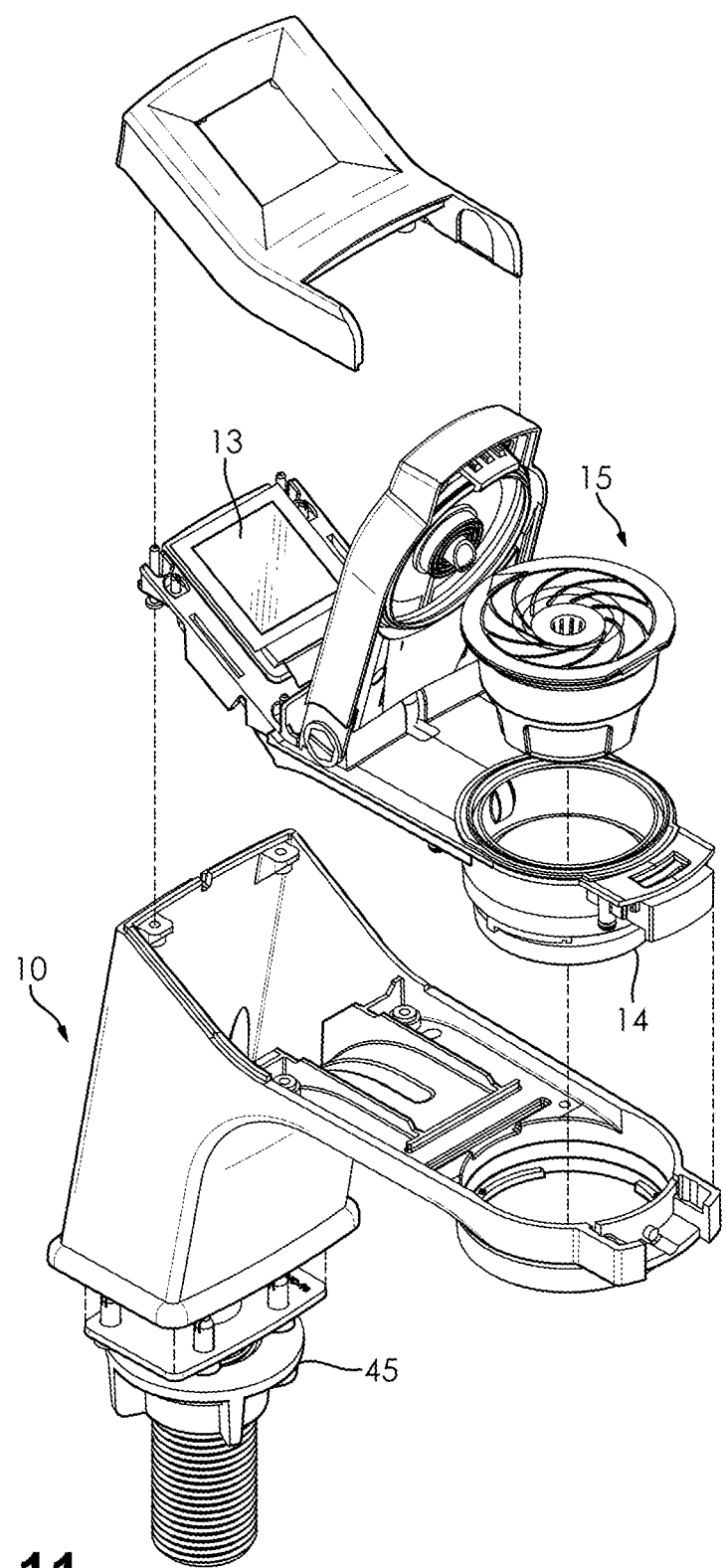
FIG. 11 is an exploded view of a dispenser head of an integrated hybrid water and beverage dispenser assembly, in accordance with an embodiment of the present invention.
Figure 12:
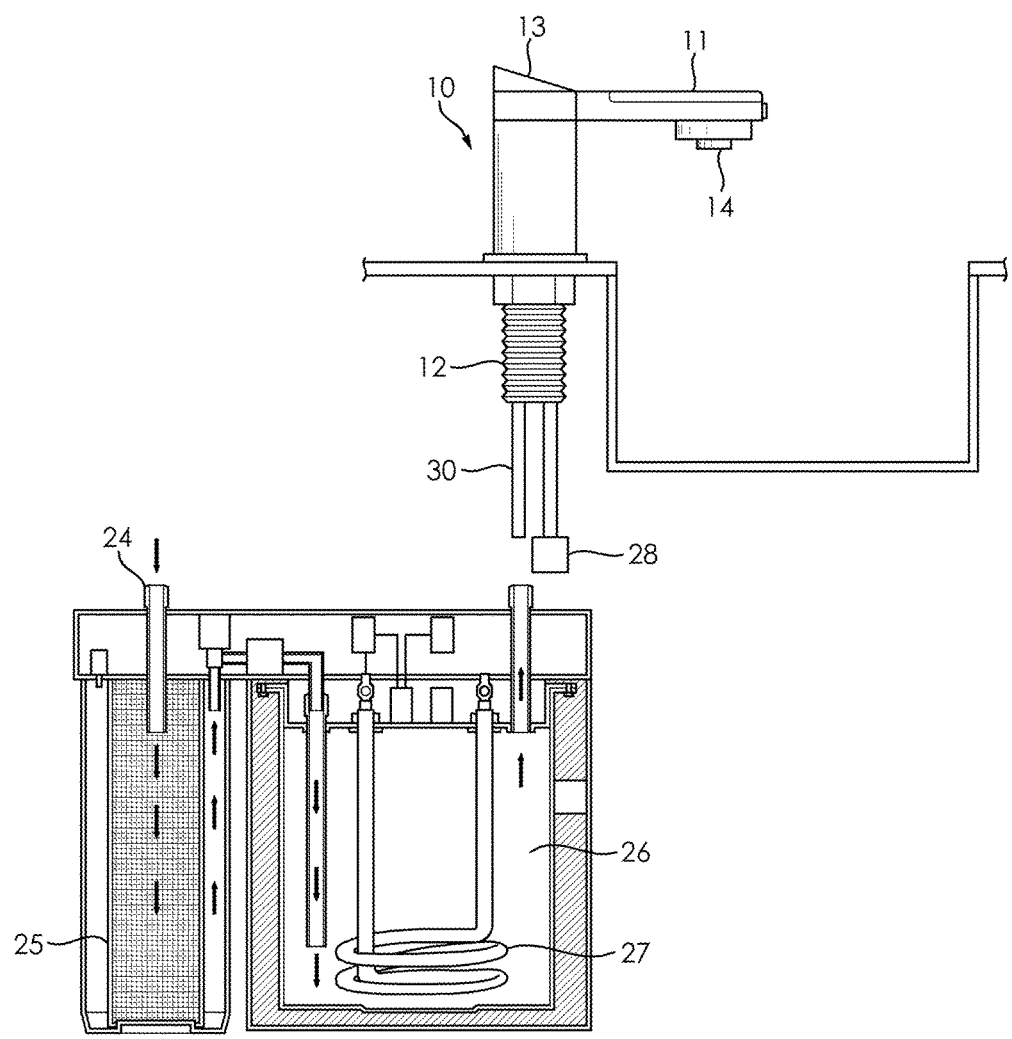
FIG. 12 is a side view of an integrated hybrid water and beverage dispenser system with a cross-section view of a water supply unit and a faucet head assembly attached to a standard water basin (e.g., sink), in accordance with an embodiment of the present invention.

According to an embodiment of the present invention, a disposable proprietary beverage medium cup assembly comprises a body 54, filter media 44, sealing media 33, sealing rib 39, and metering vanes 38, as shown in FIGS. 9 and 10. The body 54 is constructed with walls having large openings in an effort to reduce material required for construction which ultimately reduces cost to produce and waste associated with the beverage medium cup disposal. The large openings are positioned towards the lower portion of body 54 side walls.

According to an embodiment of the present invention, filter media 44 is appropriately sized to cover just the openings reducing the overall quantity of filter media required, thus further reducing cost to produce and waste associated with the beverage medium cup disposal. Mesh size of the filter media 44 is optimized to both restrict dispensing of beverage media sediment and aid in the metering of brewed beverage liquid. Metering is further accomplished by restricting flow of brewed beverage liquid through metering vanes 38 being appropriately sized and sealing rib 38 which interfaces between the proprietary medium cup and floor of beverage medium compartment 14 forcing brewed beverage liquid to dispense through metering vanes 38 (See, FIGS. 18A-18B). Metering optimizes saturation and extraction of brewed beverage liquid. One of ordinary skill in the art would appreciate that there are numerous methods for providing metered dispensing of brewed beverage liquid and embodiments of the present invention are contemplated for use with any appropriate method for providing metered dispensing of brewed beverage liquid.

According to an embodiment of the present invention, a unique tray design provides for packaging of multiple single serve beverage mediums having open wall construction (e.g., FIGS. 9 and 10) providing an airtight seal around each individual beverage medium. The airtight seal mitigates oxidizing of beverage media contained in the beverage medium during shipment and storage. The tray allows for stacking such that multiple trays may be packed in a secondary cardboard box. The trays may be constructed such that they can be disposable or reusable. In other embodiments, airtight or otherwise sealed containers may be utilized, where the containers comprise multiple compartments or a single resealable compartment for the purpose of retaining beverage mediums until ready for utilization with the apparatus. One of ordinary skill in the art would appreciate that there are numerous forms and styles of trays and sealed containers that could be utilized with embodiments of the present invention, and embodiments of the present invention are contemplated for use with any appropriate forms and style of tray and sealed container.

According to an embodiment of the present invention, the apparatus may be configured to determine a freshness of the contents of a beverage medium cup based on the amount of time a beverage medium cup is maintained in the beverage medium compartment 14. The control component can be configured to monitor insertion of a beverage medium cup and if the beverage medium cup is not used to brew a beverage within a given time period (e.g., 24 hours), the apparatus can signal the user that the beverage medium cup needs to be replaced as it has likely become stale or otherwise compromised. Since introduction of oxygen would oxidize the beverage media contained in the beverage medium cup, the flavor of any beverage brewed from any such beverage media exposed to oxygen could be compromised if not brewed in reasonable timeframe. One of ordinary skill in the art would appreciate that the oxidation time, and the time the system uses to determine freshness could vary, and embodiments of the present invention re contemplated for use with any appropriate time period.

According to an embodiment of the present invention, the beverage medium cups may be integrated with a sensor portion configured to interact with a sensor portion integrated into the faucet head assembly 10 in order to allow for the apparatus to determine whether a beverage medium cup is in the beverage medium compartment 14 or not. For instance, a beverage medium cup may include a first Hall Effect Sensor portion (e.g., magnet) while a compatible Hall Effect Sensor portion (e.g., magnetic field detection sensor) could be integrated into a wall of the lid component 11 or a wall of the beverage medium compartment 14 and operably connected to the control elements of the apparatus for determining the presence of a beverage medium cup in the beverage medium compartment 14. This is advantageous for automatically switching dispense type (e.g., from water only to brewed beverage) without interaction from the user as the apparatus can be configured to provide water when no beverage medium is inserted in the beverage medium compartment and beverage dispensing features when a beverage medium is inserted in the beverage medium compartment. Also, sensing of a beverage medium in the beverage medium compartment is useful for determining a state of the beverage medium (i.e. used status or freshness).

In a preferred embodiment, a sensor portion in the beverage medium cup is not required. Instead, a contact switch or other pressure sensor is integrated into the faucet head assembly and extends into the beverage medium compartment such that the insertion of a beverage media cup into the beverage medium compartment depresses the contact switch and alerts the system of the presence of a beverage medium cup in the beverage medium compartment. Other sensor types include, but are not limited to, RFIDs, NFC means, capacitance, or any combination thereof. One of ordinary skill in the art would appreciate that there are numerous types of sensors that could be utilized with embodiments of the present invention, and embodiments of the present invention are contemplated for use with any appropriate type of sensor.

Operation and Use

Figure 19:
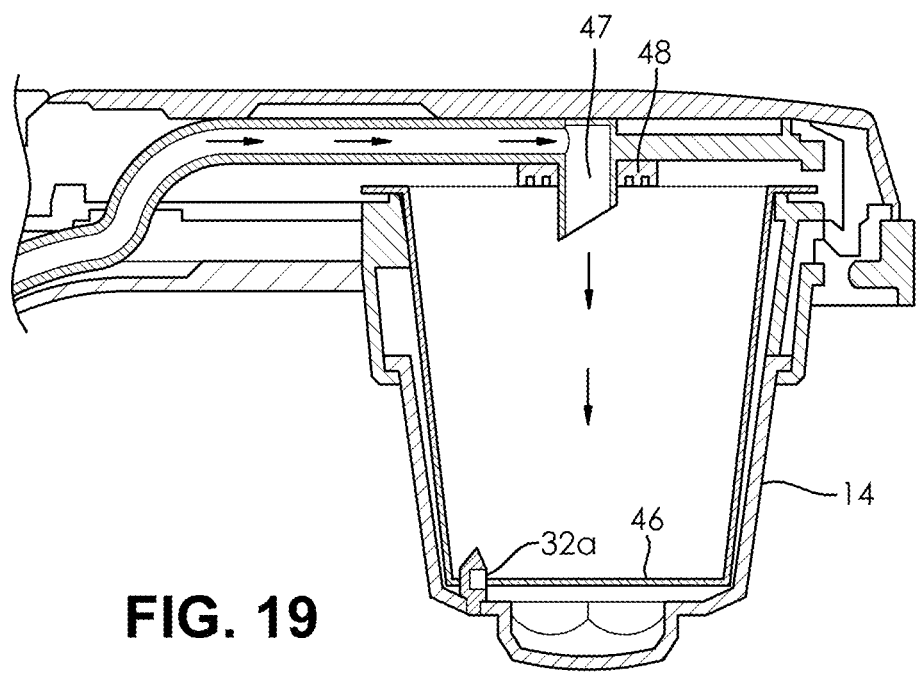
FIG. 19 is a cross-sectional side view of a dispenser head of an integrated hybrid water and beverage dispenser assembly, in accordance with an embodiment of the present invention.
Figure 20:
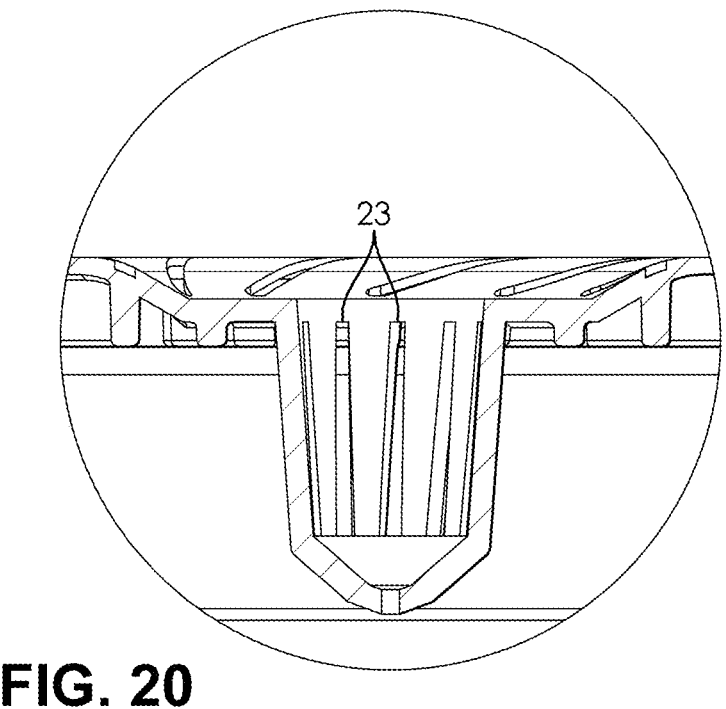
FIG. 20 is a cross-sectional side view of a beverage medium cup inlet with elongated angular slots, in accordance with an embodiment of the present invention.
Figure 21:
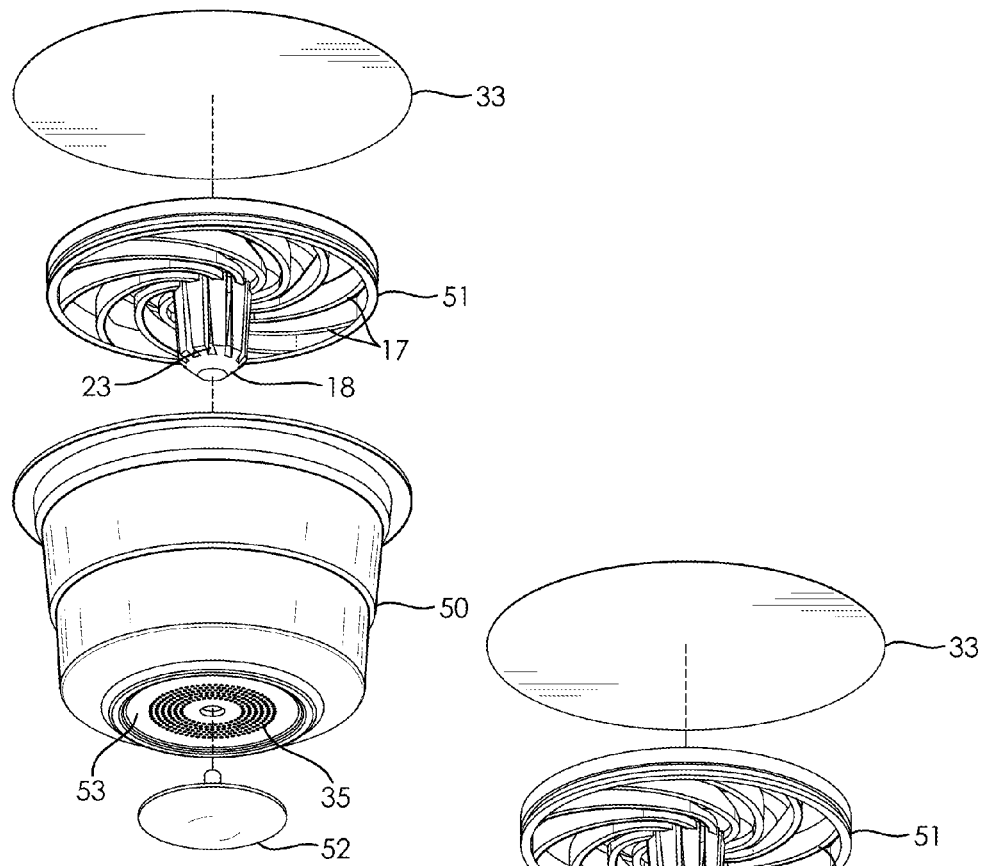
FIG. 21 is an exploded perspective view of a beverage medium cup, in accordance with an embodiment of the present invention.
Figure 22:
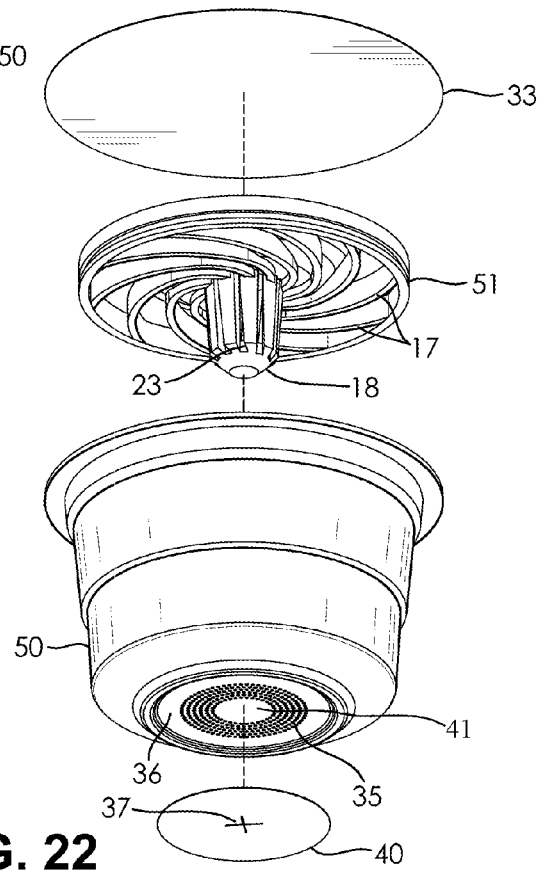
FIG. 22 is an exploded perspective view of a beverage medium cup, in accordance with an embodiment of the present invention.

According to an embodiment of the present invention, in use, control elements of the apparatus may be configured to provide control and timing of water being taken in from the pressurized water source (e.g., residential water supply) and passed through the system into the beverage medium compartment and out to a beverage container. In a preferred embodiment, when dispensing is requested, valves will open allowing for pressure from the pressurized water source to push hot water from the reservoir tank up into the faucet head assembly 10 and into the beverage medium compartment. While the water received from the pressurize water source may be cold, it is pushed into the reservoir tank such that the hot water in the reservoir tank is pushed out and up into the faucet head assembly 10 without significant mixing with the cold water from the pressurized water source. Passage of water from the faucet head assembly through the beverage medium compartment 14 (with or without a beverage medium being inserted therein) can be seen in FIG. 18A. Similarly, FIG. 19 shows the passage of water through the beverage medium compartment 14, but in this instance, a needle 32 is used to puncture a beverage medium cup 46 (i.e., standard prior art cup with no lower one-way valve) and a channel 32a in the needle 32 is provided to allow passage of liquid from the beverage medium cup 46 out through a bottom portion of the beverage medium compartment 14.

According to an embodiment of the present invention, the control element may be configured to intermittently allow water or other liquid from the apparatus into the beverage medium compartment. By utilizing pulses of liquid, determined by the beverage container size and brew body selection (e.g., saturation level of liquid in beverage media), the saturation time of a liquid in a beverage media contained in a beverage medium cup is longer than systems using constant liquid flow, as constant liquid flow increases the pressure and speed at which the liquid is forced out of the apparatus and into the beverage container. The total brew time may be increased in this method, but it allows for a deeper and fuller saturation and extraction process.

According to an embodiment of the present invention, the control element may be configured to allow a user to select between extraction styles. For instance, the control element may allow a user to select a quick extraction process, whereby liquid is continuously applied to the beverage medium compartment in order to provide a lighter flavored brewed beverage, or the control element may allow the user to select a rich extraction process, utilizing the pulsed brew method detailed above. The control element may further be configured to allow the user to select various gradations between a light and rich extraction, allowing the user to select their preferred balance between depths of extraction.

According to an embodiment of the present invention, the control element may also allow for the provision of hot water through the system without requiring a beverage medium cup or other beverage medium to be retained in the beverage medium compartment. This allows the apparatus to provide users with fresh filtered hot water for use by the user. In certain embodiments, the water supply unit may also further provide for a fluid conduit between the water filtering unit and the faucet head assembly 10 that does not go through the reservoir tank and/or heating element, allowing for cold filtered water to be dispensed by the apparatus as well. Switching between the two could be accomplished by way of one or more valves controlled by the control element.

According to an embodiment of the present invention, provision of hot water through the apparatus may require the user to continuously engage with the control element (e.g., press a button on the screen) in order to prevent continued dispensing of hot water which could burn or otherwise harm users or bystanders. In other embodiments, hot water may be provided for a duration or quantity specified by the user (e.g., through the use of the control element). In still further embodiments, hot water may be continuously provided until termination is triggered via a user interacting with the control element (e.g., via the touch screen display 13).

According to an embodiment of the present invention, the control element allows users to select and modify numerous options and settings of the apparatus. Options for modification include, but are not limited to, beverage temperature, liquid dispensing temperature, beverage timers (e.g., automatic brewing times), beverage container size (i.e., size of a container receiving brewed beverage from the apparatus—in any format, such as ounces or milliliters), brew body (e.g., light, dark, medium), beverage type (e.g., tea, coffee, hot chocolate), or any combination thereof. The control element may provide information to the user, via a display element 13, related to statuses or conditions of the apparatus or components thereof, including, but not limited to, filter status, beverage medium cup status, lid component positioning (e.g., open, closed), water heating status (e.g., current temperature status, heating element status, delay until full heat is achieved), or any combination thereof. The control element may also be configured to utilize and display various timers and clocks for various purposes, including showing the time and date and timing or displaying dispensing times, brew times, estimated time until completion of a cycle (e.g., brew cycle, cleaning cycle, heating cycle), or any combination thereof.

According to an embodiment of the present invention, the control element may further be configured to provide safety features and functions. For instance, the control unit may use sensors integrated or located on or in the lid component 11, beverage medium compartment 14 or any combination thereof to automatically terminate a brew cycle or dispensing cycle if the lid component 11 is opened by the user. The control element could also be configured to lock the lid component 11 to the faucet head assembly 10 during a brew or dispensing cycle in order to prevent opening of the lid component during such a cycle and only release the lock upon completion of the cycle or termination of a cycle by the user. One of ordinary skill in the art would appreciate that there are numerous safety features that could be incorporated and used with embodiments of the present invention, and embodiments of the present invention are contemplated for use with any appropriate safety feature.

Although the systems and apparatus of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and apparatus may be made without departing from the spirit or scope of the present disclosure. Accordingly, such changes, modifications, enhancements and/or refinements are encompassed within the scope of the present invention. Furthermore, the drawings and descriptions are to be regarded as illustrative in nature and not restrictive.

The invention claimed is:

1. A integrated hybrid water and beverage dispenser apparatus, said apparatus comprising:
   a water supply unit, comprising a heating element, reservoir tank, water inlet port and water outlet port;
   a faucet head assembly, comprising a control element, water supply line, a data transmission cable, a beverage medium compartment and a faucet head stem,
   wherein said water supply line of said faucet head assembly passes through a channel formed in said faucet head stem and connects to said water outlet port of said water supply unit such that liquid may travel between said water supply unit and said beverage medium compartment,
   wherein said data transmission cable of said faucet head assembly passes through said channel formed in said faucet head stem and connects to said water supply unit of said water supply unit and provides for transmission of data between said water supply unit said control element of said faucet head assembly,
   wherein said faucet head stem is configured to extend through a surface and be secured thereupon by way of a securing element, and
   wherein said control element comprises a human interface device configured to allow input from a user and select an operating mode from two or more modes of operation,
   wherein said input effects control of said faucet head assembly,
   wherein a first mode of operation of said two or more modes of operation engages the water supply unit such that water is allowed to be heated by said heating element and received from said reservoir tank through said water supply line and into said beverage medium compartment and out through a beverage dispensing port on said beverage medium compartment,
   wherein a second mode of operation of said two or more modes of operation engages the water supply unit such that water which has not been heated by said heating element is allowed through said water supply line and into said beverage medium compartment and out through a beverage dispensing port on said beverage medium compartment,
   wherein said control element transmits a selection of said operating mode to said water supply unit via said data transmission cable which engages execution of said operating mode by said water supply unit.

2. The apparatus of claim 1, wherein said human interface device is a touch screen display that also provides one or more graphical user interfaces to a user.

3. The apparatus of claim 1, wherein said water is received into a lid component attached to said faucet head assembly prior to receipt into said beverage medium compartment and provided into said beverage medium compartment via a water delivery needle.

4. The apparatus of claim 1, wherein said lid component is comprised of a hinge element allowing for the movement of the lid component between two or more states, a first state being a closed state in which a seal is formed between said lid component and said beverage medium compartment wherein the transmission of the water may occur, and a second state being an open state in which the lid component is at a point distal from said beverage medium compartment wherein a beverage medium may be removed or inserted into said beverage medium compartment and wherein said transmission of the water is restricted.

5. The apparatus of claim 4, wherein the movement of said lid component between said first state and said second state is detectable by said control component via one or more lid state sensors.

6. The apparatus of claim 1, wherein said water supply unit further comprises a water filtering unit configured to receive water from said water inlet port and purify said water prior to transmitting said water to said reservoir tank.

7. The apparatus of claim 1, wherein said heating element is integrated with said reservoir tank and provides for the heating of water in said reservoir tank for use in said faucet head assembly.

8. The apparatus of claim 1, wherein said beverage medium compartment is removably attachable to said faucet head assembly.

9. The apparatus of claim 1, wherein a water delivery needle is integrated into said lid component and provides water into an inlet spout integrated into a lid of a beverage medium cup contained in said beverage medium compartment, whereby water is injected through said inlet spout and through angular elongated slots in said lid of said beverage medium cup into a beverage medium cup body whereby the water is forced to swirl in one direction providing for contact with a beverage media contained in said beverage medium cup.

10. The apparatus of claim 9, wherein said beverage medium cup further comprises a mesh being appropriately sized and metering vanes which interface between a bottom of the beverage medium cup and the beverage medium compartment such that water saturated with flavorings from the beverage media is allowed to pass through the mesh, through the metering vanes and out through a beverage outlet port of said beverage medium compartment.

11. The apparatus of claim 9, wherein said beverage medium cup further comprises a seal having a region around its perimeter permanently affixed to a bottom of the beverage medium cup over integrated filter holes on said bottom portion of said beverage medium cup with a center region of said bottom portion of said beverage medium cup having no filter holes and a perforation in a center region of the seal that is releasably retained on said center region of said bottom portion of said beverage medium cup such that head pressure in the cup via gasses or liquid open the perforation, allowing liquid from the integrated filter holes to escape.

12. The apparatus of claim 11, wherein the center region of the seal is retained on said center region of said bottom portion of said beverage medium cup by high viscosity food grade silicone oil.

13. The apparatus of claim 9, wherein said beverage medium cup further comprises an elastomeric umbrella valve affixed to a bottom of the beverage medium cup and positioned over integrated filtering holes on said bottom portion of said beverage medium cup, wherein head pressure in the cup via gases or liquid allow for the movement of the elastomeric umbrella valve from a closed position to an open position, allowing the gasses or liquids to escape from the integrated filter holes.

\* \* \* \* \*